United States Patent [19]

Pendlebury et al.

[11] 4,362,852

[45] Dec. 7, 1982

[54] DEVOLATILIZING MOLTEN POLYMER WITH A ROTARY DISK PROCESSOR

[75] Inventors: David Pendlebury, Chester, Va.; Hugh H. Rowan, Chapel Hill, N.C.; Edward J. Buyalos, Chester, Va.

[73] Assignee: Allied Corporation, Morris Township, Morris County, N.J.

[21] Appl. No.: 302,907

[22] Filed: Sep. 16, 1981

[51] Int. Cl.$^3$ .................. C08G 63/76; C08F 283/00; C08L 67/00

[52] U.S. Cl. ............................. 525/437; 264/176 F; 264/211; 525/439; 528/272; 528/274; 528/309; 528/310; 528/481

[58] Field of Search ............... 528/272, 274, 309, 310, 528/481; 264/176 F, 211; 525/437, 439

[56] References Cited

U.S. PATENT DOCUMENTS

| | | | |
|---|---|---|---|
| Re. 28,937 | 8/1976 | Wagner et al. | 260/78 L |
| 2,863,854 | 12/1958 | Wilson | 260/75 |
| 3,294,756 | 12/1966 | Russell et al. | 260/78 |
| 3,480,586 | 11/1969 | Forster et al. | 528/481 |
| 3,578,640 | 5/1971 | Twilley et al. | 260/78 |
| 3,728,083 | 4/1973 | Greenburg et al. | 23/285 |
| 3,813,366 | 5/1974 | Wright et al. | 260/78 L |
| 3,969,324 | 7/1976 | Berkau et al. | 528/481 X |
| 3,976,431 | 8/1976 | Boggs et al. | 23/285 |
| 4,139,521 | 2/1979 | Lazarus et al. | 528/289 X |
| 4,142,805 | 3/1979 | Tadmor | 366/97 |
| 4,171,422 | 10/1979 | Lazarus et al. | 528/437 |
| 4,194,841 | 3/1980 | Tadmor | 366/75 |

FOREIGN PATENT DOCUMENTS 48-41713 12/1973 Japan.

*Primary Examiner*—Lucille M. Phynes
*Attorney, Agent, or Firm*—Richard A. Anderson

[57] ABSTRACT

This invention is an improved process to remove volatiles from molten synthetic, preferably fiber forming relatively high viscosity polymers which comprises passing molten polymer through a rotary disk polymer processor at a temperature of between 260° C. and 300° C. at a rate of between about 10 and 75 pounds (4.5 and 34 kg) per hour per square foot (0.093 m$^2$) of processor filming area, at a rotational rate of between about 5 and 75 rpm for the disks, and a processor having between 1 and 20 stages.

9 Claims, No Drawings

DEVOLATILIZING MOLTEN POLYMER WITH A ROTARY DISK PROCESSOR

BACKGROUND OF THE INVENTION

This invention relates to a method to devolatilize polymer with a rotary disk processor. The disk processor can be as disclosed in U.S. Pat. Nos. 4,194,841 and 4,142,805, both hereby incorporated by reference. The method of the invention is used to remove reaction by-products, and unreacted components such as ethylene glycol and monomers and undesirable by-products such as oligomers from relatively high viscosity molten polymers, particularly polyester and nylon polymers. Removal of the volatile component makes possible a polymer which can be spun into fiber, extruded as film or shaped into other shaped objects.

Preparation of polyester and particularly a thermally stabilized polyethylene terephthalate (PET) is taught in U.S. Pat. No. 4,171,422, hereby incorporated by reference. Other methods of creating low carboxyl polyesters are taught in Japanese Pat. No. 41 713 to Shima et al. and U.S. Pat. No. 2,863,854 to Wilson, hereby incorporated by reference. These methods can create volatile by-products, such as carbon dioxide, which form bubbles which would destroy the integrity of the final shaped product such as fiber. The volatile by-products must be removed quickly to prevent degradation of the molten polymer and regain of carboxyl groups. Special engineering has been utilized in the past to shorten the time of transit between formation of the desired polymer in molten state and the spinning or other shaping apparatus. See U.S. Pat. No. 4,072,663, hereby incorporated by reference. In order that the polymer, particularly polyester, is protected from degradation, additives such as to create low carboxyl group levels and thermal stability, should be added at the last possible point in the processing apparatus, such as the final finisher as described in the prior art U.S. Pat. Nos. 3,976,431; 3,728,083 and Re. 28,937, all hereby incorporated by reference.

Preparation of nylon polymer is described in U.S. Pat. Nos. 3,294,756; 3,813,366 and 3,578,640, all hereby incorporated by reference. Here the problem of the prior art has been efficient removal of the monomer and oligomers left in the polymer just prior to shaping, spinning or extruding it. Prior art methods and apparatus are bulky, expensive and do not always lower the monomer and oligomer content sufficiently, particularly when the molten polymer is shaped or extruded (spun) from the molten state, rather than forming solid particles which could be washed with water to remove monomer and oligomers. By "relatively high viscosity" is meant polymer of viscosity high enough to be shaped, spun, extruded or the like, preferably nylon of viscosity above 35 relative viscosity, and polyester above 0.72 intrinsic viscosity.

SUMMARY

The method of this invention provides a quick, efficient, relatively inexpensive means of removing volatiles such as carbon dioxide, monomers, oligomers and other undesirable components from molten synthetic, preferably fiber-forming polymer.

This invention is an improvement in a process to remove volatiles from synthetic, fiber-forming, relatively high viscosity polymers. The improvement comprises passing the molten polymer through a rotary disc polymer processor at temperature between about 260° and 320° C. at a rate of between about 10 and 75 pounds per hour per square foot of process of filming area, and a rotational rate of between about 5 and 75 rpm of the disks, the processor having between about 1 and 20 stages. The preferred polymers are nylon and polyester. When the polymer is polyester, it is preferably polyethylene terephthalate having an intrinsic viscosity above 0.72 and containing about 15 to 30 carboxyls per million per ends of polyester before processing. The pressure in the processor may be constant or staged between atmospheric and 5 to 10 Torr (5 to 10 mm Hg). The film thickness of the polyester in the processor should be between about 0.025 and 0.50 inch (0.0625 and 1.25 cm). Additional reactive materials can also be fed into the processor with the polyester in order to lower the carboxyl level of the polymer. The preferred reactive additive is ethylene carbonate with a catalyst added in excess so that the carboxyl content of the polyester is lowered to between 2 and 5; the reaction by-product carbon dioxide is removed by the processor, the excess of ethylene carbonate is vaporized and removed by the processor so that the residual amount of ethylene carbonate in the polyester is between about 75 and 125 ppm and the residual amount of carbon dioxide in the polyester is between about 25 and 75 ppm. More preferably, the viscosity of the feed polymer to the processor for polyester is above 0.72, most preferably between about 0.94 to about 0.97 intrinsic viscosity, and the viscosity of the polymer exiting the processor is above 0.70 and most preferably between about 0.90 to about 0.92 intrinsic viscosity. When the processor feeds into a spinning apparatus to spin the polyester into fiber or monofilament, the processor should be located within a few feet of the spinning apparatus so that the low carboxyl level is maintained at below 10 per $10^6$ grams in the fiber spun from the polyester.

A preferred nylon for processing is poly-epsilon-caprolactam which can contain about 6 to 12 percent by weight of monomer and oligomers fed to the processor and having a relative viscosity of above 30, most preferably about 35 when fed to the processor. The pressure in the processor should be between 2 and 100 Torr (2 and 100 mm Hg), and the thickness of the polymer film in the processor should be between about 0.0005 and 0.15 inch (0.00125 and 0.375 cm) and the monomers and oligomers should be vaporized and removed by the processor so that only between about 2 and 5 percent by weight remain in the polymer exiting the processor. It is preferred for processing nylon that the processor is multistaged and the pressure is about 100 Torr (100 mm Hg) initial stage of the processor and about 5 Torr (5 mm Hg) at the final stage of the processor. It is also preferred that the feed temperature be between about 265° C. and 275° C. The feed rate is preferred between about 25 and 30 pounds per hour per square foot (122.3–146.8 kg/hr/m²) of processor filming area and the processor temperature is maintained at between 265° C. and 275° C. for nylon. Also, for nylon the overall low pressure is preferred between about 4 and 7 Torr (4 and 7 mm Hg), the processor disk rotation is between about 15 and 25 rpm and the processor film thickness is between about 0.02 and 0.03 inch (0.05 and 0.075 cm).

NYLON EXAMPLE

Nylon melt from a reactor or dryed nylon chips containing about 9 to 10 weight percent monomer plus cyclic and linear oligomers are fed to the first stage of a multistage diskpack processor. Inlet melt is maintained at 260° C.–300° C., preferably about 270° C. The rotary disk processor (Diskpack) can contain from 1 to 20 stripping stages. Three stages were used. Feed enters the first stage or several stages and passes in series or parallel flow through the remaining stages. Feed rate is 10–70 pounds per hour per foot$^2$ (48.9–342.5 kg/hr/m$^2$) of Diskpack filming surface, preferably 30 pounds per hour per foot$^2$ (146.8 kg/hr/m$^2$). Vacuum is maintained on the stripping stages of the Diskpack with any conventional vacuum system. Vacuum level should be maintained at 2–100 Torr (2–100 mm Hg), preferably about 5 Torr (5 mm Hg). Vacuum level on the first stage could be 100 Torr (100 mm Hg) and decreased to 5 Torr in last stripping stage.

Polymer at 260° C.–300° C., preferably 270° C., exit the last stage of the Diskpack containing about 2.5 weight percent monomer and oligomers. Vapors (monomer and oligomers) exit the vapor outlet on the Diskpack and are condensed in any conventional condenser for recycle to the nylon process. Vapor lines from the Diskpack to the condenser are heated above about 90° C.–100° C. Polymer exit the Diskpack can go directly to a spinning block or may be pelletized.

Films in the Diskpack can be controlled at about 0.005 inch (0.0125 cm) to 0.150 inch (0.375 cm). Speed of the Diskpack can be operated at 5–75 rpm, preferably about 20 rpm.

POLYETHYLENE TEREPHTHALATE (PET) EXAMPLES

Polyester from a final finisher at about 280° C. and 0.94–0.97 intrinsic viscosity and containing about 20 carboxyls per 10$^6$ grams is injected with ethylene carbonate and a catalyst to reduce the carboxyl number of the polymer. This material with the additive is fed to a Diskpack processor operating at a vacuum of about 5–10 Torr (5–10 mm Hg). The Diskpack is heated with liquid or vapor medium to maintain about 280° C. on unit. The 3-stage unit is fed at a rate of about 25–75 pounds per hour per foot$^2$ (122.3–367 kg/hr/m$^2$) of filming surface in the Diskpack. Film thickness in the Diskpack is controlled at about 0.025 inch to 0.050 inch (0.0625 to 0.125 cm). Materials (polyester plus the additive) react in the first stage(s) of the Diskpack to lower the carboxyl end of the polyester and form inert gas (carbon dioxide). An excess of ethylene carbonate was added to the polymer. As material passes through the Diskpack, the excess ethylene carbonate and $CO_2$ are stripped down to levels of about 100 ppm and 50 ppm, respectively.

This method requires the Diskpack to operate with stages of decreasing pressure from approximately atmospheric to a final 5–10 Torr (5 to 10 mm Hg). Alternatively, the ethylene carbonate and catalyst can be added to the inlet line at a residence time of approximately one minute before entry to the Diskpack and mixed using a static mixer, such as a Kenics, so that the reaction is complete before entry to the Diskpack.

Overheads from the Diskpack pass to a condenser where the carbonate is removed and the $CO_2$ emitted to the atmosphere. The polymer exits the Diskpack at about 280° C. with an intrinsic viscosity of about 0.90–0.92 and containing about 2–5 carboxyl units per 10$^6$ grams of products. This polymer is pumped to a spin block where low carboxyl yarn or monofilament is produced.

the Diskpack is located very close to the spin block in order that the COOH number can be maintained as low as possible (reduce thermal degradation).

Another embodiment is adding N-epoxypropylphthalimide (as in U.S. Pat. No. 4,139,521) hereby incorporated by reference) to the inlet feed to a rotary disk processor, allowing a five-minute reaction period, and proceeding as above.

We claim:

1. In a process to remove volatiles from molten synthetic, relatively high viscosity polymers the improvement comprising passing the molten polymer through a rotary disc polymer processor at a temperature of between about 260° C. and 300° C., at a rate of between about 10 and 75 pounds per hour per square foot (48.9 to 367 kg/hr/m$^2$) of processor filming area, at a rotational rate of between about 5 and 75 rpm of the disks, and said processor having between about one and twenty stages.

2. The process of claim 1 wherein the polymer is selected from the group consisting of fiber-forming nylon and polyester.

3. The process of claim 2 wherein the polyester is polyethylene terephthalate having an intrinsic viscosity above 0.72 and containing about 15 to 30 carboxyls per million grams of polymer before processing, the pressure in the processor is between about 5 and 10 Torr (5 and 10 mm Hg), the film thickness of the polyester in the processor is between about 0.025 and 0.050 inch (0.0625 and 0.125 cm) and additional reactive materials are also fed into the processor with the polyester in order to lower the carboxyl level of the polymer.

4. The process of claim 3 wherein the reactive additive is ethylene carbonate with a catalyst, added in excess so that the carboxyl content of the polyester is lowered to between about 2 and 5, the reaction by-product carbon dioxide gas is removed by the processor, the excess of ethylene carbonate is vaporized and removed by the processor so the residual amount of ethylene carbonate in the polyester is between about 75 and 125 ppm and the residual amount of carbon dioxide in the polyester is between about 25 and 75 ppm.

5. The process of claim 4 wherein the viscosity of the feed polymer to the processor is between about 0.94 to about 0.97 intrinsic viscosity, and the viscosity of the polymer exiting the processor is between about 0.90 to 0.92 intrinsic viscosity.

6. The process of claim 5 wherein the processor feeds into a spinning apparatus to spin the polyester into fiber and said processor is located within a few feet of said spinning apparatus so that the low carboxyl level is maintained at below 10 per 10$^6$ grams in the fiber spun from the polyester.

7. The process of claim 2 wherein the nylon is poly-epsilon-caprolactam fed to the processor containing between about 6 to 12 percent by weight of monomer and oligomers, having a relative viscosity of above 35, the pressure in the processor is between 2 and 100 Torr (2 and 100 mm Hg), the thickness of the polymer film in the processor is between about 0.005 and 0.15 inch (0.0125 and 0.375 cm), and said monomers and oligomers are vaporized and removed by the processor so that only between about 2 to 5 percent by weight remain in the polymer exiting the processor.

8. The method of claim 7 wherein the processor is multistaged and the pressure is about 100 Torr (100 mm Hg) at the initial stage of the processor and about 5 Torr at the final stage of the processor.

9. The method of claim 7 wherein the feed temperature is between about 265° and 275° C., the feed rate is between about 25 and 35 pounds per hour per square foot (122.3 to 171.2 kg/hr/m²) of processor filming area, the processor temperature is maintained at between about 265° C. and 275° C., the overall low pressure is between about 4 and 7 Torr (4 and 7 mm Hg), the processor disk rotation is between about 15 and 25 rpm and the processor film thickness is between about 0.02 and 0.03 inch (0.05 and 0.75 cm).

* * * * *